Figure 1:
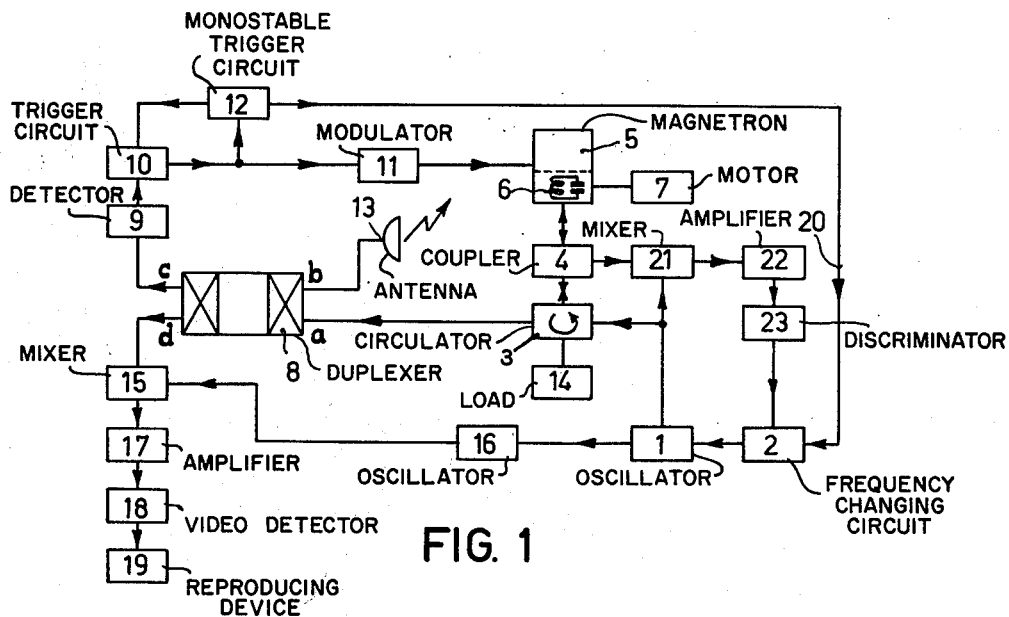

> United States Patent Office 3,168,736
Patented Feb. 2, 1965

3,168,736
RADAR TRANSCEIVER DEVICE
Nils Erik Gustav Backmark, Farsta, Florian Sellberg, Djursholm, Hans Olof Evert Arkhammar and Torbjoern Joergensen, Stockholm, and Jan Pieter Oscar Kinberg, Bromma, Sweden, assignors to North American Philips Company, Inc., New York, N.Y., a corporation of Delaware
Filed Jan. 12, 1960, Ser. No. 1,957
Claims priority, application Sweden, Jan. 12, 1959, 251/59, 252/59, 253/59
8 Claims. (Cl. 343—17.1)

The invention relates to a radar transceiver device.

Such devices comprise, as a rule, a transmitting tube having a tuned circuit determining the frequency of the radar pulses to be transmitted, a modulator to produce a transmitting pulse by means of the transmitting tube, and a receiver having a mixing stage and a local oscillator to derive an intermediate-frequency signal from the incoming echo signal.

The invention provides a radar transceiver device in which the frequency of the transmitted radar pulses can be rapidly and arbitrarily varied within a comparatively wide range, so that the system can be disturbed by third persons only with difficulty, while the echo signals can be amplified in the same, fixed intermediate-frequency channel.

In accordance with the invention the radar transceiver device comprises means to continuously vary the tuning of the tuned circuit of the transmitting tube and a device for comparing the unexcited resonant frequency of this circuit with the frequency of the local oscillator in order to actuate the modulator to produce a transmitting pulse when a predetermined relationship occurs between the two frequencies. Means are also provided to vary the frequency of the local oscillator only during an interval between the end of the maximum useful echo time and the transmission of the next-following radar pulse.

Figure 2:
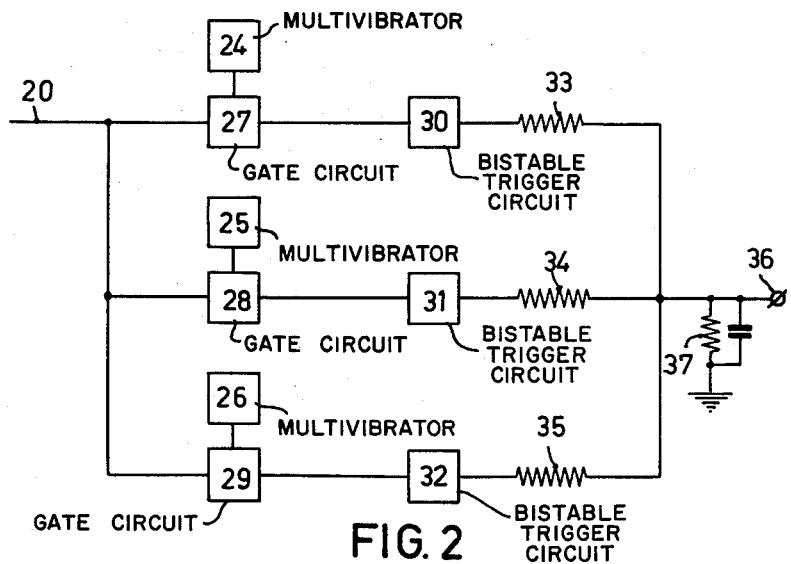

The invention will be described more fully with reference to the drawing in which:

FIG. 1 shows diagrammatically one embodiment of a radar transceiver device according to the invention, and FIG. 2 shows a device for varying the frequency of the local oscillator.

The device shown in FIG. 1 comprises a local oscillator 1, of which the frequency is determined by the frequency variator 2 and will provisionally be considered to be constant. The output oscillation of the local oscillator 1 is supplied by way of the circulator 3 and the coupling device 4 to the magnetron 5. The unexcited resonant frequency of the magnetron is determined by an incorporated circuit 6, which may consist, for example, of one or more cavity resonators and which is periodically detuned under the action of a motor 7. The magnetron 5 may, for example, be constructed as described in United States Patent No. 2,931,943. Part of the energy applied to the magnetron is reflected and applied by way of the coupling device 4 and the circulator 3 to the arm $a$ of the push-pull duplexer 8. The duplexer 8 has the property that waves of comparatively low power are transmitted only in a diagonal direction, i.e. for example, from the arm $a$ to the arm $c$ and from the arm $b$ to the arm $d$ or conversely, but, for example, not from the arm $a$ to the arm $b$ or conversely. Waves of comparatively high power, however, are transmitted only between adjacent arms, for example, from the arm $a$ to the arm $b$. Such duplexers are known per se and are described, for example, in "Electronics" of August 1954, pages 149–151. They comprise, to this end, for example, one or two directional couplings and one or two gas-filled chambers, which are ignited by waves of comparatively high power.

The energy of comparatively low power reflected by the magnetron 5 and fed to the arm $a$ of the duplexer, can therefore not be supplied by way of the arm $b$ to the aerial 13 connected to this arm and be radiated, but it is fed via the arm $c$ to the crystal detector 9, which supplies a low-frequency output voltage to the trigger circuit 10. The value of the energy reflected by the magnetron depends upon the ratio between the unexcited resonant frequency of the tuned circuit 6 and the frequency of the oscillation supplied by the local oscillator 1. If these frequencies are not equal, the reflection is comparatively great. At the instant when the frequencies become equal to each other, an abrupt reduction in reflected energy occurs, so that the trigger circuit 10 is activated and transfers a pulse to the modulator 11 and the monostable trigger circuit 12. The modulator 11 supplies a strong pulse to the magnetron 5, so that the latter starts generating and produces a strong transmitting pulse. This pulse is supplied to the aerial 13 through the coupling device 4, the circulator 3 and the arms $a$ and $b$ of the duplexer 8. The aerial radiates the pulse in a beam. In order to prevent energy which might be reflected by the duplexer 8 or the aerial 13 from being supplied to the local oscillator 1, the fourth arm of the circulator 3 is closed reflection-free by the load 14.

The radar echo signals received via the aerial 13 travel by way of arms $b$ and $d$ of the duplexer 8 to the push-pull mixing stage 15, which also receives an oscillation from the local oscillator 16 to form an intermediate-frequency signal. The intermediate-frequency signal is amplified in the intermediate-frequency amplifier 17, and is fed to the video detector 18, which supplies a video signal to the reproducing device 19. The frequency of the generator 16 deviates by a fixed amount from the frequency of the local oscillator 1 so that by mixing the oscillations of generator 16 with the echo signals the desired intermediate frequency is obtained. The frequency of the echo signals is, of course, equal to that of the transmitting pulses produced by the magnetron 5. These pulses, as stated above, are produced at the instant when the unexcited resonant frequency of the circuit 6 of the magnetron becomes equal to the frequency of the local generator 1. In practice it has been found, however, that as a result of the space charges occurring during oscillation in the magnetron the frequency of the produced oscillation is, in general, not equal to the natural frequency of the circuit 6 in the nonoscillating condition, but deviates therefrom by a fixed amount. If the intermediate frequency is chosen to be equal to this frequency difference, the generator 16 may be dispensed with and the auxiliary oscillation required for mixing in the mixing stage 15 may be obtained directly from the local oscillator 1.

After a radar pulse has been transmitted, the circuit 6 is further detuned under the action of the motor 7. In order to prevent another transmitting pulse from being immediately produced thereafter, as a result of the unexcited resonant frequency of the circuit 6 becoming equal to the frequency of the local oscillator during the required echo period, the output pulse of the pulse generator 10 is, as stated above, also fed to the monostable trigger circuit 12. The circuit 12 thus assumes an operational position, in which it blocks the generator 10. The trigger circuit 12 returns automatically to the rest position after a time slightly longer than the useful echo time, and supplies a pulse to the frequency variator 2, by way of the conductor 20, when the trigger circuit 12 has assumed the rest position. The variator 2 determines the frequency of the local oscillator 1. Under the action of this pulse the variator 2 varies the frequency of the local oscillator 1. The trigger circuit 12 thus serves as a delay circuit for initiating a frequency variation of the oscillator 1 not sooner than a predetermined time following a pulse transmission. As soon as the unexcited resonant frequency of the circuit 6 becomes equal to the new frequency of the oscillator 1, another radar pulse is transmitted on a different wavelength, after which the process is repeated. Since there is a fixed relationship between the frequency of the transmitted radar pulses and the frequency of the local oscillator 1, signals of the desired intermediate frequency may always be derived from the echo signals. By continuously varying arbitrarily the wavelength of the transmitted radar pulses and hence also of the echo signals, the latter can be disturbed on purpose by third persons only with difficulty. In this respect it is important that in the system according to the invention the time interval between the successive radar puless is not constant.

The arrangement shown in FIG. 1 also comprises means for permitting the slight readjustment, during operation, of the frequency of the local oscillator. To this end a small quantity of energy is fed during the production of a transmitting pulse by the generator 5 by means of the coupling device 4 to the mixing stage 21. Mixer 21 mixes this oscillation with an auxiliary signal from the local oscillator 1. The difference frequency output of mixer 21 is applied, subsequent to amplification in the amplifier 22, to a discriminator 23. The discriminator 23 supplies to the frequency variator 2 an output voltage which is proportional to the deviation from the desired oscillator frequency, so that the variator 2 readjusts the frequency of the local oscillator during each transmitting pulse cycle.

The frequency of the local oscillator may be advantageously varied with the aid of a frequency variator as shown in FIG. 2. This arrangement comprises a plurality of multivibrators 24, 25, 26 with individually different frequencies, each controlling a gate circuit 27, 28 and 29 so that these gate circuits, for example, in the positive phase of the associated multivibrators, supply the control-pulses occurring across the conductor 20 to the bistable trigger circuits 30, 31 and 32. The gate circuits are blocked in the negative phase of the associated multivibrators. The bistable trigger circuits 30, 31, 32 supply, in the two stable states, different currents to the output resistors 33, 34 and 35, of which the common output point 36 is connected to earth via the output resistor 37, shunted by a capacitor. The voltage of point 36 may therefore have a plurality of different values, i.e. as many as the number of combinations of different states of the trigger circuits 30, 31 and 32. By increasing the number of trigger circuits, the number of different voltages may be increased at will. This arrangement operates as follows. When a control-pulse is received by way of the conductor 20 at an instant when given multivibrators 24, 25, 26 are in the positive phase, the associated gate circuits 27, 28, 29 will pass the pulse, as stated above, so that the associated bistable trigger circuits 30, 31, 32 go over to the opposite state, so that also a different output voltage is produced at the terminal 36. It therefore depends upon the instant when the control-pulse occurs across the conductor 20, which new voltage will occur, so that, in general, the voltage at point 36 varies in an arbitrary manner, at least in a manner which can not be imitated practically. The voltage at point 36 controls, in known manner, the frequency of the local oscillator 1, for example with the aid of a reactance tube and this voltage remains constant until the next-following pulse is supplied. The frequency of the local oscillator 1 is therefore constant during the echo time.

What is claimed is:

1. A radar system comprising a source of first high frequency oscillations having tuned oscillation frequency determining means, a modulator connected to energize said source of first oscillations, means connected to said tuned means for continuously varying the tuning frequency thereof, a source of second oscillations, means connected to compare the frequency of said second oscillations with the unexcited resonant frequency of said tuned means to derive a signal when a predetermined relationship exists between said unexcited resonant frequency and the frequency of said second oscillations, means for applying said signal to said modulator to momentarily energize said source of first oscillations, means for transmitting said first oscillations, means for changing the frequency of said second oscillations, and means responsive to said signal connected to said frequency changing means for changing the frequency of said second oscillations only during a predetermined time subsequent the energization of said source of first oscillations.

2. A radar system comprising a source of first high frequency oscillations having tuned oscillation frequency determining means, a modulator connected to energize said source of first oscillations, means connected to said tuned means for continuously varying the unexcited resonant frequency thereof, a source of second oscillations, means connected to compare the frequency of said second oscillations with said unexcited resonant frequency to provide a signal when a predetermined relationship exists between said unexcited resonant frequency and the frequency of said second oscillations, means for applying said signal to said modulator to momentarily energize said source of first oscillations, means for transmitting said first oscillations, means for receiving said first oscillations reflected from a target, means for varying the frequency of said second oscillations in finite steps, and delay means responsive to said signal connected to said frequency varying means for changing the frequency of said second oscillations by a finite amount a predetermined time subsequent the energization of said source of first oscillations.

3. A radar system comprising a magnetron having a tuned circuit for determining the frequency of oscillations thereof, means for continuously varying the unexcited resonant frequency of said tuned circuit, a modulator connected to energize said magnetron, a source of local oscillations, means for comparing the frequency of said local oscillations with said unexcited resonant frequency to provide a signal when a predetermined relationship exists therebetween, means for applying said signal to said modulator to momentarily energize said magnetron, whereby said magnetron produces a pulse of high frequency energy, means for transmitting said pulse, means for receiving echo signals of the frequency of said pulse, means for varying the frequency of said local oscillations in finite steps, delay means responsive to said signal connected to said frequency varying means for changing the frequency of said local oscillations by a finite amount a predetermined time subsequent the energization of said magnetron, whereby the frequency of each said pulse is different from the frequency of the preceding pulse.

4. The system of claim 3 in which said means for applying said signal to said modulator comprises a trigger circuit, means for applying said signal to said trigger circuit, and means for applying the output of said trigger circuit to said modulator, and said delay means comprises a monostable multivibrator, means applying the output of said trigger circuit to trigger said monostable multivibrator, and means for applying the output of said multivibrator to said trigger circuit whereby said trigger circuit is rendered inoperative for a predetermined time subsequent the energization of said magnetron.

5. The system of claim 3 in which said means for varying the frequency of local oscillations comprises a plurality of gate circuits, a plurality of astable multivibrators having different oscillation frequencies, each multivibrator being connected to control a different one of said gate circuits, means applying the output of said delay means in parallel to the inputs of said gate circuits, a plurality of bistable trigger circuits each having an input circuit connected to the output of a different gate circuit, means connecting the outputs of said trigger circuits to a common terminal, and means for varying the frequency of said local oscillator in response to the voltage at said terminal, whereby the frequency of said local oscillator is varied in a random manner.

6. A radar system comprising a magnetron having a tuned circuit for determining the frequency of oscillation thereof, means for continuously varying the unexcited resonant frequency of said tuned circuit, a modulator connected to energize said magnetron, a source of local oscillations, means for applying said local oscillations to said tuned circuit, a duplexer having first, second, third and fourth terminals for transferring low energy signals between said first and third terminals and between said second and fourth terminals, and for transferring high energy signals between said first and second terminals, antenna means connected to said second terminal, means connecting the output of said magnetron to said first terminal whereby high energy output signals of said magnetron are applied to said antenna means and local oscillations reflected from said tuned circuit are applied to said third terminal, frequency determining means connected to said third terminal for providing a trigger signal when a predetermined frequency relationship exists between said local oscillations and the unexcited resonant frequency of said tuned circuit, means applying said trigger signal to said modulator to momentarily energize said magnetron, whereby a pulse of high frequency energy is applied to said antenna, means for varying the frequency of said local oscillations in finite steps, delay means responsive to said trigger signal for changing the frequency of said local oscillations by a finite amount a predetermined time subsequent the energization of said magnetron, whereby the frequency of each said pulse is different from the frequency of the preceding pulse, and receiver means connected to said fourth terminal.

7. The system of claim 6 comprising a circulator having first, second, third and fourth arms, means applying said local oscillations to said first arm, means connecting said second arm to said tuned circuit, means connecting said third arm to said first terminal, and load means connected to said fourth arm.

8. The system of claim 6 in which said receiver means comprising mixing means coupled to said fourth terminal, means applying oscillations having a fixed relationship with respect to the frequency of said local oscillations to said mixing means whereby an intermediate frequency is produced, and means for amplifying and detecting said intermediate frequency signals.

References Cited in the file of this patent
UNITED STATES PATENTS

| | | |
|---|---|---|
| 2,461,144 | Cook | Feb. 8, 1949 |
| 2,543,042 | Miller | Feb. 27, 1951 |
| 2,603,744 | Larson | July 15, 1952 |
| 2,884,627 | Ratcliffe | Apr. 28, 1959 |